United States Patent
Ruutu et al.

(10) Patent No.: US 11,830,522 B2
(45) Date of Patent: Nov. 28, 2023

(54) COMPUTER IMPLEMENTED METHOD AND AN APPARATUS FOR SILENCE DETECTION IN SPEECH RECOGNITION

(71) Applicant: Elisa Oyj, Helsinki (FI)

(72) Inventors: Ville Ruutu, Helsinki (FI); Jussi Ruutu, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/253,449

(22) PCT Filed: Dec. 14, 2021

(86) PCT No.: PCT/FI2021/050869
§ 371 (c)(1),
(2) Date: May 18, 2023

(87) PCT Pub. No.: WO2022/129691
PCT Pub. Date: Jun. 23, 2022

(65) Prior Publication Data
US 2023/0326481 A1    Oct. 12, 2023

(30) Foreign Application Priority Data
Dec. 18, 2020 (FI) .................. 20206336

(51) Int. Cl.
*G10L 25/87* (2013.01)
*G10L 25/78* (2013.01)

(52) U.S. Cl.
CPC ........ *G10L 25/87* (2013.01); *G10L 2025/786* (2013.01)

(58) Field of Classification Search
CPC .......................... G10L 25/87; G10L 2025/786
(Continued)

(56) References Cited

U.S. PATENT DOCUMENTS 9,576,593 B2 *  2/2017  Pakhomov .............. G10L 15/02
2006/0080096 A1   4/2006  Thomas et al.
(Continued)

FOREIGN PATENT DOCUMENTS

EP    2874148 A1    5/2015

OTHER PUBLICATIONS

C. Panagiotakis and G. Tziritas, "A speech/music discriminator using RMS and zero-crossings," 2002 11th European Signal Processing Conference, Toulouse, France, 2002, pp. 1-4. (Year: 2002).*

(Continued)

*Primary Examiner* — Bharatkumar S Shah
(74) *Attorney, Agent, or Firm* — ZIEGLER IP LAW GROUP, LLC (57) ABSTRACT

A computer implemented method for speech recognition from an audio signal includes: obtaining initial values for silence detection parameters including: a lead period; a threshold amplitude; and a terminal period. Detect an amplitude of the audio signal at a first time T1 of the audio signal. Optionally adjusting the threshold amplitude based on the detected amplitude. Starting the speech recognition from a second time T2 of the audio signal. Starting silence detection from the audio signal when the lead period has elapsed after the second time T2 including: responsive to detecting an amplitude below the threshold amplitude for a duration of the terminal period, terminating the speech recognition and the silence detection at a third time T3 of the audio signal and adjusting the silence detection parameters based on the detected amplitude changes of the audio signal between the first time T1 and the third time T3.

14 Claims, 4 Drawing Sheets

(58) Field of Classification Search
USPC .......................................................... 704/233
See application file for complete search history.

(56) References Cited

U.S. PATENT DOCUMENTS

| | | | |
|---|---|---|---|
| 2010/0016746 A1* | 1/2010 | Hampton | A61B 5/747 |
| | | | 600/523 |
| 2015/0112673 A1* | 4/2015 | Nandy | G10L 19/002 |
| | | | 704/231 |
| 2017/0213569 A1 | 7/2017 | Jang et al. | |
| 2017/0270919 A1 | 9/2017 | Parthasarathi et al. | |
| 2018/0012591 A1* | 1/2018 | Aleksic | G10L 15/05 |
| 2018/0261239 A1 | 9/2018 | Falk et al. | |

OTHER PUBLICATIONS

Audacity Silence Finder—Setting Parameters. [online], Jun. 19, 2020, [retrieved on Aug. 10, 2021], 3 pages.

European Patent Office, Notification of Transmittal of the International Search Report and the Written Opinion of the International Searching Authority, or the Declaration, PCT/FI2021/050869, dated Mar. 14, 2022, 15 pages.

Finnish Patent and Registration Office, Search Report, Application No. 20206336, dated Aug. 13, 2021, 2 pages.

Ishizuka, K. et al. A Feature for Voice Activity Detection Derived from Speech Analysis with the Exponential Autoregressive Model. In: 2006 IEEE International Conference on Acoustics Speech and Signal Processing Proceedings. IEEE [online], May 19, 2006, pp. I-789 to I-792.

* cited by examiner

310: Obtaining initial values for silence detection parameters such as a lead period, a threshold amplitude, and a terminal period.

320: Starting to detect the amplitude of the audio signal at a first time T1 of the audio signal.

330: Optionally, adjusting the threshold amplitude based on the detected amplitude.

340: Starting the speech recognition form a second time T2 of the audio signal.

350: Starting the silence detection from the audio signal when lead period has elapsed after the second time T2.

360: Adjusting the silence detection parameters based on the detected amplitude changes of the audio signal between the first time T1 and the third time T3.

370: Optionally, the method is repeated for multiple segments of the audio signal.

380: Optionally, terminating the speech recognition and the silence detection after a pre-set time limit in response to detecting that the speech recognition has not been terminated.

390: Optionally, providing an output.

COMPUTER IMPLEMENTED METHOD AND AN APPARATUS FOR SILENCE DETECTION IN SPEECH RECOGNITION

TECHNICAL FIELD

The present disclosure generally relates to speech recognition. The disclosure relates particularly, though not exclusively, to recognition the end of the speech.

BACKGROUND

This section illustrates useful background information without admission of any technique described herein representative of the state of the art.

Speech recognition systems enable communication between a user and a device or a system without separate button controls, or without having to contact a touch module allowing to control the device or the system more easily. In addition, speech recognition systems may form a part of a human-machine interface. The speech recognition systems are used, for example, in voice guided systems and telephone bots. Some functionalities of smartphones, for example, may also rely on speech recognition.

In speech recognition, silence recognition plays a crucial role. This is particularly important in real time speech recognition systems since the system has to be able to differentiate between natural pauses in the speech and the end of the speech.

A new approach for silence detection is provided.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a computer implemented method for speech recognition from an audio signal. The method comprises:
obtaining initial values for silence detection parameters comprising:
  a lead period;
  a threshold amplitude; and
  a terminal period;
starting to detect an amplitude of the audio signal at a first time T1 of the audio signal;
optionally, adjusting the threshold amplitude based on the detected amplitude;
starting the speech recognition from a second time T2 of the audio signal, wherein the second time T2 is at or after the first time T1;
starting silence detection from the audio signal when lead period has elapsed after the second time T2 comprising:
  responsive to detecting amplitude below the threshold amplitude for a duration of the terminal period, terminating the speech recognition and the silence detection at a third time T3 of the audio signal; and
adjusting the silence detection parameters based on the detected amplitude changes of the audio signal between the first time T1 and the third time T3.

In an embodiment, the method further comprises: adjusting the lead period based on the duration from the second time T2 to a first instance the amplitude of the audio signal exceeds the threshold amplitude.

In an embodiment, the method further comprises: adjusting the terminal period based on duration of periods wherein the amplitude of the audio signal is below the threshold amplitude.

In an embodiment, the method further comprises: adjusting the threshold amplitude based on background noise level and/or the detected amplitude of the speech.

In an embodiment, the method further comprises: repeating the method for multiple segments of the audio signal.

In an embodiment, the initial values of the lead period and/or the terminal period; and/or the adjusting the lead period and/or the terminal period is based on a speech context comprising: an expected speech type and/or an expected use-case type.

In an embodiment, the initial values of the silence detection parameters; and/or the adjusting the silence detection parameters is/are based on a statistical estimate of the silence detection parameters; and the method further comprises calculating the statistical estimate using any one or more of: average; moving average; squared average; Kalman filtering; or time-series analysis based methods comprising autoregressive moving average (ARMA) and autoregressive integrated moving average (ARIMA).

In an embodiment, the method further comprises: calculating the statistical estimates from audio signal samples comprising at least one of: audio signal samples of the current use-case, audio signal samples of the previous use-case(s) of the current user, and audio signal samples from multiple users.

In an embodiment, the method further comprises: providing an output comprising indication of the termination of the speech recognition.

In an embodiment, the method further comprises: terminating the speech recognition and the silence detection after a pre-set time limit in response to detecting that the speech recognition has not been terminated.

In an embodiment, the method further comprises: coding the audio signal using pulse code modulation; and detecting the amplitude of the audio signal based on the pulse code modulation.

According to a second example aspect of the present invention, there is provided an apparatus comprising a processor and a memory including computer program code; the memory and the computer program code configured to, with the processor, cause the apparatus to perform the method of the first aspect or any related embodiment.

In an embodiment, the apparatus is selected from a group consisting of: a telephone bot; a member of a voice guiding system; and a voice guided device.

According to a third example aspect there is provided a computer program comprising computer executable program code which when executed by at least one processor causes an apparatus at least to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of any preceding aspect.

Any foregoing memory medium may comprise a digital data storage such as a data disc or diskette, optical storage, magnetic storage, holographic storage, opto-magnetic storage, phase-change memory, resistive random-access memory, magnetic random-access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Figure 1:
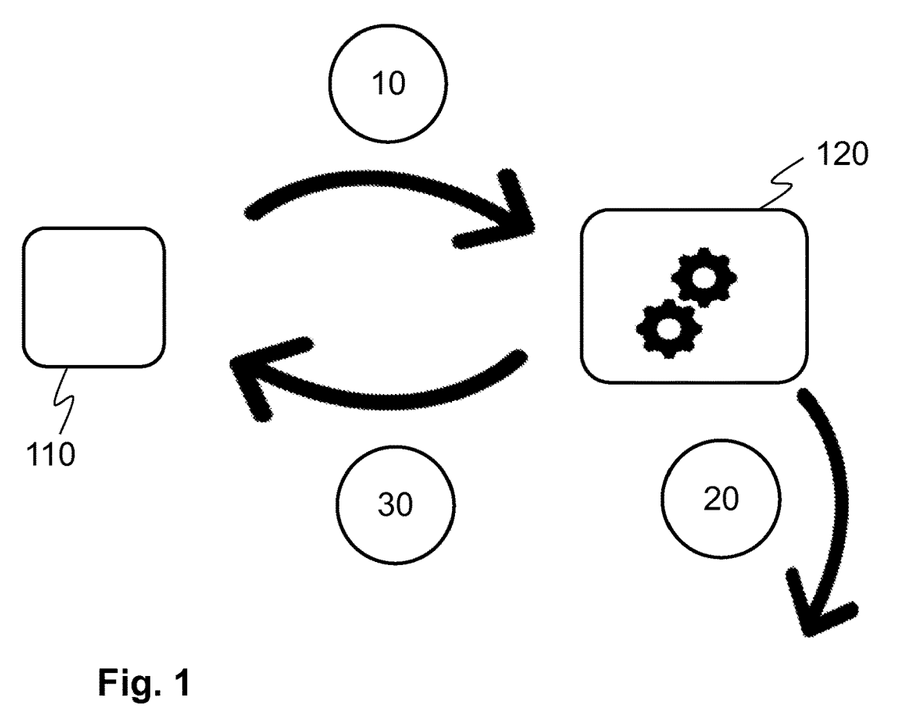
FIG. 1 shows an example scenario of speech recognition.

FIG. 1 shows an example scenario of speech recognition. The scenario shows a user 110 and a speech recognition system 120. In an embodiment of the invention, the scenario of FIG. 1 operates as follows: In a first phase 10, the speech recognition system 120 inputs an audio signal from the user 110. The speech recognition system 120 recognizes speech from the audio signal. In a second phase 20, the speech recognition system 120 outputs the recognized speech. In an embodiment, the recognized speech is in text format, e.g., a transcription. In an embodiment, the output comprises instructions or commands based on the recognized speech. In a third phase 30, the speech recognition system 120 may provide a communication to the user 110. The communication may comprise an audio part, such as a spoken prompt. In an embodiment, the communication comprises the recognized speech. In another embodiment, the communication comprises a question to the user 110.

In another example, the scenario of FIG. 1 starts from the third phase 30: The speech recognition system 120 provides the communication to the user 110. In the first phase 10, the user 110 provides input to the speech recognition system 120. Then, in the second phase 20, the speech recognition system 120 provides an output. Alternatively, or additionally, the third 30 and first 10 phases may be performed repeatedly before the second phase 20.

The process may be manually or automatically triggered. The process may be triggered for example by a user calling to an automated telephone bot or a caller bot calling to a user. The telephone bot may be operating, e.g., in a customer service system. In an embodiment, the process may be triggered by a user giving voice instructions to a voice-guided system. The voice-guided system may be comprised in, or configured to control, e.g., any one or more of: a smartphone; a tablet computer; or a car.

Figure 2:
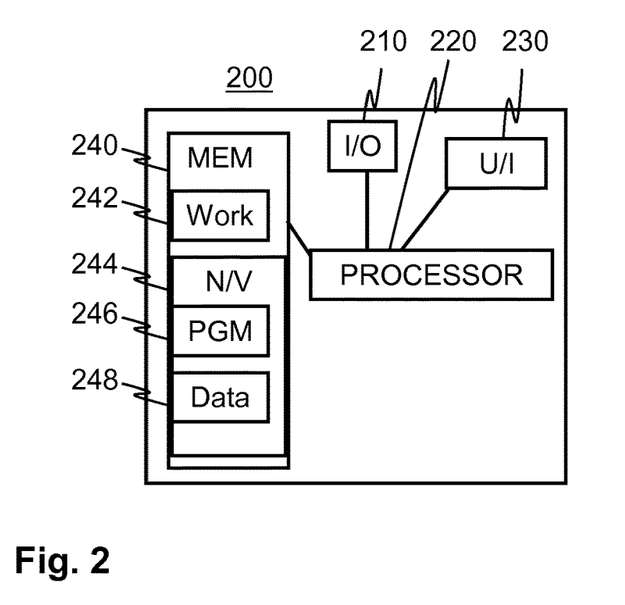
FIG. 2 shows a block diagram of an apparatus according to an example embodiment.

FIG. 2 shows a block diagram of an apparatus 200 according to an example embodiment. The apparatus 200 comprises a communication interface 210; a processor 220; a user interface 230; and a memory 240. The apparatus 200 is for example a general-purpose computer or server or some other electronic data processing apparatus. The apparatus 200 can be used for implementing embodiments of the invention. That is, with suitable configuration the apparatus 200 is suited for operating for example as the speech recognition system 120 of the foregoing disclosure.

The communication interface 210 comprises in an embodiment a wired and/or wireless communication circuitry, such as Ethernet; Wireless LAN; Bluetooth; GSM; CDMA; WCDMA; LTE; and/or 5G circuitry. The communication interface can be integrated in the apparatus 200 or provided as a part of an adapter, card or the like, that is attachable to the apparatus 200. The communication interface 210 may support one or more different communication technologies. The apparatus 200 may also or alternatively comprise more than one of the communication interfaces 210.

The processor 220 may be a central processing unit (CPU), a microprocessor, a digital signal processor (DSP), a graphics processing unit, an application specific integrated circuit (ASIC), a field programmable gate array, a microcontroller or a combination of such elements.

The user interface may comprise a circuitry for receiving input from a user of the apparatus 200, e.g., via a keyboard, graphical user interface shown on the display of the apparatus 200, speech recognition circuitry, or an accessory device, such as a headset, and for providing output to the user via, e.g., a graphical user interface or a loudspeaker.

The memory 240 comprises a work memory 242 and a persistent memory 244 configured to store computer program code 246 and data 248. The memory 240 may comprise any one or more of: a read-only memory (ROM); a programmable read-only memory (PROM); an erasable programmable read-only memory (EPROM); a random-access memory (RAM); a flash memory; a data disk; an optical storage; a magnetic storage; a smart card; a solid state drive (SSD); or the like. The apparatus 200 may comprise a plurality of the memories 240. The memory 240 may be constructed as a part of the apparatus 200 or as an attachment to be inserted into a slot, port, or the like of the apparatus 200 by a user or by another person or by a robot. The memory 240 may serve the sole purpose of storing data, or be constructed as a part of an apparatus 200 serving other purposes, such as processing data.

A skilled person appreciates that in addition to the elements shown in FIG. 2, the apparatus 200 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus 200 if external power supply is not available.

Figure 3:
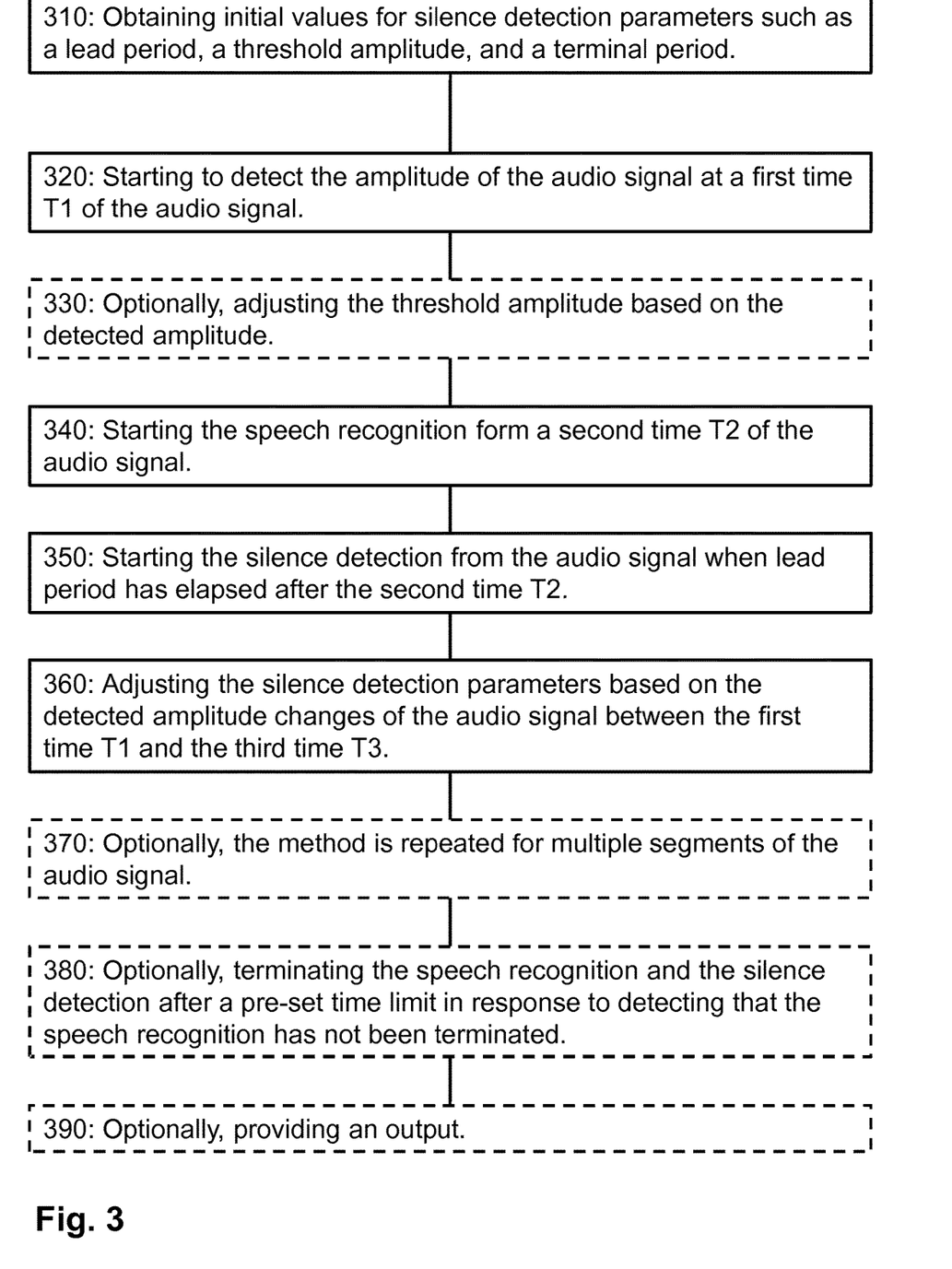
FIG. 3 shows a flow chart of a method according to an example embodiment.

FIG. 3 shows a flow chart according to an example embodiment. FIG. 3 illustrates a computer implemented method for speech recognition from an audio signal comprising various possible process steps including some optional steps while also further steps can be included and/or some of the steps can be performed more than once:

310: Obtaining initial values for silence detection parameters. The silence detection parameters may comprise a lead period, wherein the lead period is a time duration during which silence is not detected. The lead period may provide a thinking or a preparation time for a user. In an embodiment, the lead period is more than 1, 2, 3, 4 or 5 seconds. In an embodiment, the lead period is less than 2, 3, 4, 5 or 10 seconds. In an embodiment, the lead period is 2 seconds. In an embodiment, the lead period is 4 to 5 seconds. The silence detection parameters may comprise a threshold amplitude, wherein an amplitude of the audio signal below the threshold may be interpreted as silence. Speech recognition may still continue even if the amplitude of the audio would cause the silence interpretation. The silence detection parameters may comprise a terminal period, wherein the audio signal comprising amplitude below the threshold amplitude for a duration of the terminal period after the lead period is interpreted as silence. The terminal period may be provided in order not to detect silence during natural pauses or breaks of a speech. In an embodiment, the terminal period is more than 1, 2, 3, 4 or 5 seconds. In an embodiment, the terminal period is less than 2, 3, 4, 5 or 10 seconds. In an embodiment, the terminal period is 2 seconds. In an embodiment, the terminal period is 4 to 5 seconds. The silence detection parameters may further comprise other parameters related to the properties of an audio signal. The initial values of the silence detection parameters may be based on the same or similar approaches as the adjusting described in following in connection with step 360.

320: Starting to detect the amplitude of the audio signal at a first time T1 of the audio signal. The audio signal may be coded using a pulse code modulation. The amplitude may be detected based on the pulse code modulation.

330: Optionally, adjusting the threshold amplitude based on the detected amplitude. The threshold amplitude may be adjusted based on a background noise level. The background noise level may be estimated from the detected amplitude of the audio signal. The threshold amplitude may be adjusted to the background noise level and/or other environmental factors before the speech recognition is started. The environmental factors may comprise: a time of day; vehicular use prone to cause interference; and/or age of the user. In an example embodiment, sound patterns of the audio signal may be analyzed to recognize common background noise sources, e.g., a sound of an engine of a vehicle or a sound of a blowing wind, for adjusting the threshold amplitude. In a further example embodiment, data from a position sensor or acceleration sensors of a smartphone indicating, e.g., walking or driving, may be used for analyzing the background noise sources and adjusting the threshold amplitude.

340: Starting the speech recognition from a second time T2 of the audio signal. The second time T2 is at or after the first time T1. In an embodiment, the speech recognition system provides a question to the user after the first time T1 and before the second time T2. The question may end at the second time T2 and system may start to recognize the speech of the user. In another embodiment, the speech recognition system may not provide any communication to the user and the speech recognition may start at the second time T2 being equal to the first time T1 or following the first time by a given interval.

350: Starting the silence detection from the audio signal when lead period has elapsed after the second time T2. The silence detection may comprise: responsive to the detecting the amplitude below the threshold amplitude for a duration of the terminal period, terminating the speech recognition and the silence detection at a third time T3 of the audio signal. In an example embodiment, short amplitude peaks of the audio signal exceeding the threshold amplitude may be tolerated during the terminal period to cope, e.g., with background noise peaks such as placing a mobile phone in speaker mode on a desk.

360: Adjusting the silence detection parameters based on the detected amplitude changes of the audio signal between the first time T1 and the third time T3. The lead period may be adjusted based on the duration from the second time T2 to a first instance the amplitude of the audio signal exceeds the threshold amplitude. The terminal period may be adjusted based on durations of periods wherein the amplitude of the audio signal is below the threshold amplitude. These periods may be pauses in the speech. The threshold amplitude may be adjusted based on the background noise level. The threshold amplitude may be adjusted based on the detected amplitude of the speech.

In some embodiments, the adjusting the lead period and/or the terminal period may be based on a speech context. The speech context may comprise: an expected speech type and/or an expected use-case type. For example, the lead period after a familiar question having a yes/no answer may be short. The terminal period for a speech expected to comprise multiple words may be longer than for a speech known to comprise single words or only a few words. The lead period and the terminal period for an answer to a more complicated question may be longer than that for an answer to a simple question.

In some embodiments, the adjusting the silence detection parameters may be based on a statistical estimate of the silence detection parameters, wherein the statistical estimate is calculated any one or more of: average; moving average; squared average; Kalman filtering; or time-series analysis based methods comprising autoregressive moving average (ARMA) and autoregressive integrated moving average (ARIMA). The statistical estimates may be calculated from audio signal samples comprising audio signal samples of the current use-case. The statistical estimates may be calculated from audio signal samples of the previous use-case(s) of the current user. The statistical estimates may be calculated from audio signal samples from multiple users. In an example embodiment, the statistical estimates are selected so that 95% of the samples fall within the estimate.

In an embodiment, the silence detection parameters may be adjusted between pre-set minimum and maximum vales. In an embodiment, the silence detection parameters are adjusted with fixed or relative adjustments. In an example embodiment, the adjustment is selected from a group consisting of: 2%; 5%; 10%; and 20% of the current value.

In some embodiments, the initial values for the silence detection parameters obtained in step 310 are adjusted based on the same approaches as the adjusting in step 360.

370: Optionally, the method is repeated for multiple segments of the audio signal. In an embodiment, the speech recognition system may provide multiple question to the user and the speech recognition system may recognize multiple answer from the audio signal. In an example embodiment, the speech recognition system may repeat the same question multiple times if the speech recognition system fails to recognize speech from the audio signal. In an example embodiment, a telephone bot communicates with the user, provides multiple questions, and recognizes multiple answers. In an example embodiment, a voice-guided device may require further instructions from a user in response to failing to recognize the speech of the user.

380: Optionally, terminating the speech recognition and the silence detection after a pre-set time limit in response to detecting that the speech recognition has not been terminated.

390: Optionally, providing an output. The output may indicate the termination of the speech recognition. The output may comprise the adjusted silence detection parameters. The output may indicate that the speech recognition failed. The output may comprise the recognized speech. The output may comprise a transcription of the recognized speech. The output may comprise commands or instructions based on the recognized speech. The output may comprise the audio signal. The output may comprise statistical estimates calculated based on the audio signal.

FIG. 4A-4D illustrate example pulse code modulated audio signals and various periods of some example embodiments. Amplitude of a pulse code modulated audio signal is shown in the vertical axis and time from the beginning of the audio signal is shown in the horizontal axis. The pillars indicate the measured amplitudes. The lead period is indicated with an arrow 410, a dashed line 420 indicates the threshold amplitude, and the terminal period is in indicated with an arrow 430.

Figure 4A:
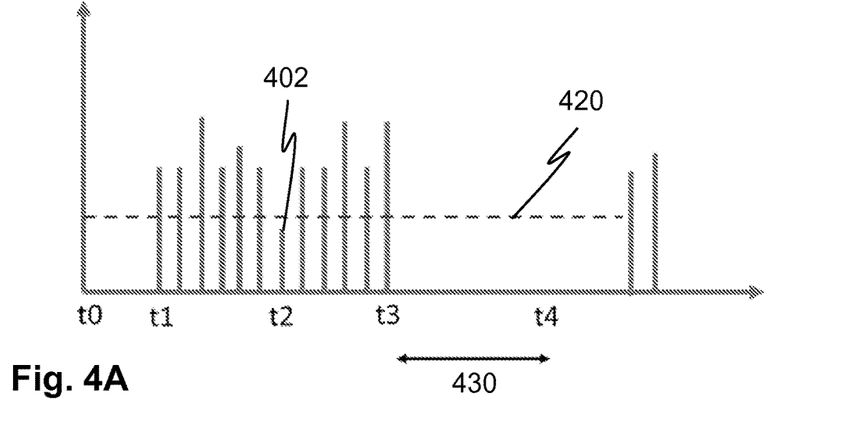
FIG. 4A-D illustrate example pulse code modulated audio signals and various periods of some example embodiments.

FIG. 4A shows an example of the terminal period. The amplitude exceeds the threshold value at t1. Since the duration between t0 and t1 is shorter than the terminal period, silence is not detected. Also, at t2 the measured amplitude 402 is below the threshold amplitude 420, but the silence is not detected since the amplitude of the audio signal exceeds the threshold amplitude 420 before the terminal period has lapsed. Amplitude 402 below the threshold amplitude 420 may be measured due to, e.g., normal pause in the speech. The amplitude of the audio signal stays below the threshold amplitude 420 for a duration of the terminal period 430. Thus, silence is detected at t4 and the speech recognition and the silence detection terminate.

Figure 4B:
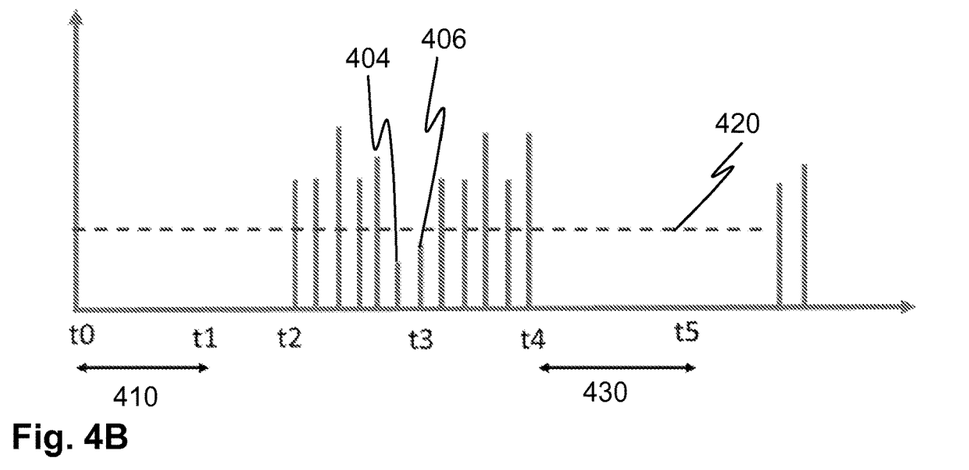

FIG. 4B shows an example of the lead and the terminal periods. The silence detection starts after the lead period 410 at t1. The amplitude exceeds the threshold value at t2. Since the duration between t1 and t2 is shorter than the terminal period, silence is not detected. Since the amplitude of the audio signal stays below the threshold amplitude 420 for a period longer than the terminal period 430 between t0 and t2, a false silence would have been detected if the lead period 410 had not been used. In this example, the user starts speaking at t2 after a long delay. These may be, e.g., due to a telephone bot asking a complicated question. For example, the bot may be asking a customer number and the user may need to check it from a letter etc. Detected amplitudes 404 and 406 are below the threshold, but since the duration is shorter than the terminal period, silence is not detected. Silence is detected at t5, since the amplitude of the audio signal stays below the threshold amplitude a duration of the terminal period after t4. The lead period and/or the terminal period may be adjusted using the disclosed methods.

Figure 4C:
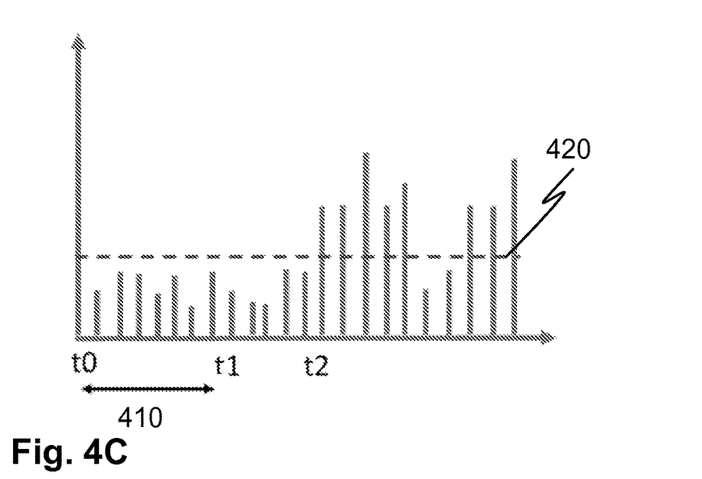

FIG. 4C shows an example of adjusting the threshold amplitude. The amplitude detection starts at t0. A telephone bot, for example, may give instruction to the user between t0 and t1. During this period, the user may be silent, but background noise level may be detected from the audio signal. The threshold amplitude may be adjusted according to the detected noise level such that the threshold is set, e.g., to the average of the detected noise level plus a safety-margin. Between t1 and t2, the user is still silent, due to e.g., thinking how to cope with the instruction given by the telephone bot, and thus only some background noise may be detected. After t2, amplitude exceeding the threshold amplitude is detected and the audio signal is interpreted as speech of the user.

Figure 4D:
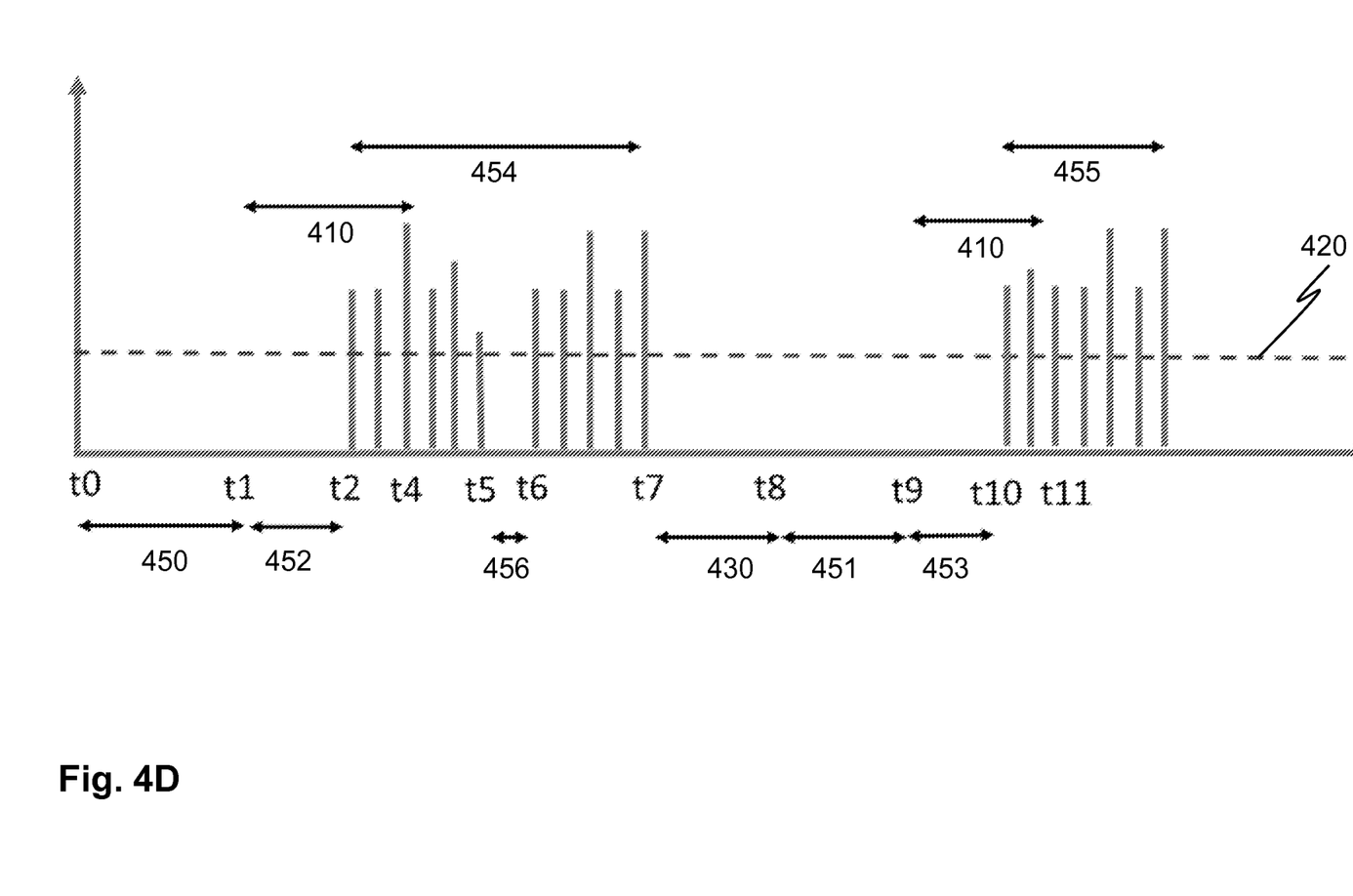

FIG. 4D shows an example where a user communicates with a speech recognition system. In this example embodiment, the user calls to a telephone bot and the bot consecutively asks questions and recognizes the answers to the questions from the audio signal. During periods 450 and 451, the telephone bot speaks giving instructions and asking questions from the user. The amplitude detection from the audio signal starts at t0. The speech recognition starts after telephone bot speeches 450 and 451 at t1 and t9. The lead periods 410 start after 450 and 451 at t1 and t9. The user stays silent during periods 452 and 453 after the telephone bot has asked questions during periods 450 and 451 due to, for example, the user thinking how to reply. The user speaks during periods 454 and 455 starting at t2 and t10. During period 456 between t5 and t6, the user has a pause in user's speech. In this example, the threshold amplitude is not adjusted, since no significant background noise is detected. The threshold amplitude may be adjusted also based on amplitude level of the speech of the user. The second lead period 410 staring at t9 has been adjusted shorter based on the silence periods 452 between t1 and t2, and 456 between t5 and t6. Furthermore, the terminal period 430 may be adjusted after t8 according to the detected behavior of the user. In this example, the speech recognition and the silence detection terminate at t8 since the silence have been detected. However, the amplitude detection from the audio signal still continues, since the telephone bot has multiple questions. After the second question, the speech recognition and silence detection start again according to the presented embodiments.

The embodiments of the invention provide automated speech recognition methods. An advantage of the invention is that adaptive silence detection may be provided. An advantage is that the silence detection may adapt to the user's speech. An advantage is that the silence detection may adapt to the environmental factors. An advantage is that the silence detection may adapts to the context of the speech.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer implemented method for speech recognition from an audio signal, the method comprising:
    obtaining initial values for silence detection parameters comprising:
        a lead period;
        a threshold amplitude; and
        a terminal period;
    starting to detect an amplitude of the audio signal at a first time T1 of the audio signal;

optionally, adjusting the threshold amplitude based on the detected amplitude;

starting the speech recognition from a second time T2 of the audio signal, wherein the second time T2 is at or after the first time T1;

starting silence detection from the audio signal when lead period has elapsed after the second time T2 comprising:
responsive to detecting amplitude below the threshold amplitude for a duration of the terminal period, terminating the speech recognition and the silence detection at a third time T3 of the audio signal; and adjusting the silence detection parameters based on the detected amplitude changes of the audio signal between the first time T1 and the third time T3.

2. The method of claim 1, further comprising adjusting the lead period based on the duration from the second time T2 to a first instance the amplitude of the audio signal exceeds the threshold amplitude.

3. The method of claim 1, further comprising adjusting the terminal period based on duration of periods wherein the amplitude of the audio signal is below the threshold amplitude.

4. The method of claim 1, further comprising adjusting the threshold amplitude based on background noise level and/or the detected amplitude of the speech.

5. The method claim 1, further comprising repeating the method for multiple segments of the audio signal.

6. The method of claim 1, wherein the initial values of the lead period and/or the terminal period; and/or the adjusting the lead period and/or the terminal period is based on a speech context comprising: an expected speech type and/or an expected use-case type.

7. The method of claim 1, wherein:
the initial values of the silence detection parameters; and/or the adjusting the silence detection parameters is/are based on a statistical estimate of the silence detection parameters; and
the method further comprises calculating the statistical estimate using any one or more of: average; moving average; squared average; Kalman filtering; or time-series analysis based methods comprising autoregressive moving average, ARMA, or autoregressive integrated moving average, ARIMA.

8. The method of claim 7, further comprising calculating the statistical estimates from audio signal samples comprising at least one of: audio signal samples of the current use-case, audio signal samples of the previous use-case(s) of the current user, and audio signal samples from multiple users.

9. The method of claim 1, further comprising:
providing an output comprising indication of the termination of the speech recognition.

10. The method of claim 1, further comprising:
terminating the speech recognition and the silence detection after a pre-set time limit in response to detecting that the speech recognition has not been terminated.

11. The method of claim 1, further comprising:
coding the audio signal using pulse code modulation; and
detecting the amplitude of the audio signal based on the pulse code modulation.

12. An apparatus comprising:
a processor, and
a memory including computer program code stored on a non-transitory computer-readable medium; the memory and the computer program code configured to, with the processor, cause the apparatus to perform, or cause performing, at least the method of claim 1.

13. The apparatus of claim 12, wherein the apparatus is selected from a group consisting of: a telephone bot; a member of a voice guiding system; and a voice guided device.

14. A computer program comprising computer executable program code stored on a non-transitory computer-readable medium, which when executed by a processor causes an apparatus to perform the method of claim 1.

* * * * *